(No Model.)
F. M. RANKIN.
FILTER FOR CISTERNS.
No. 370,281. Patented Sept. 20, 1887.
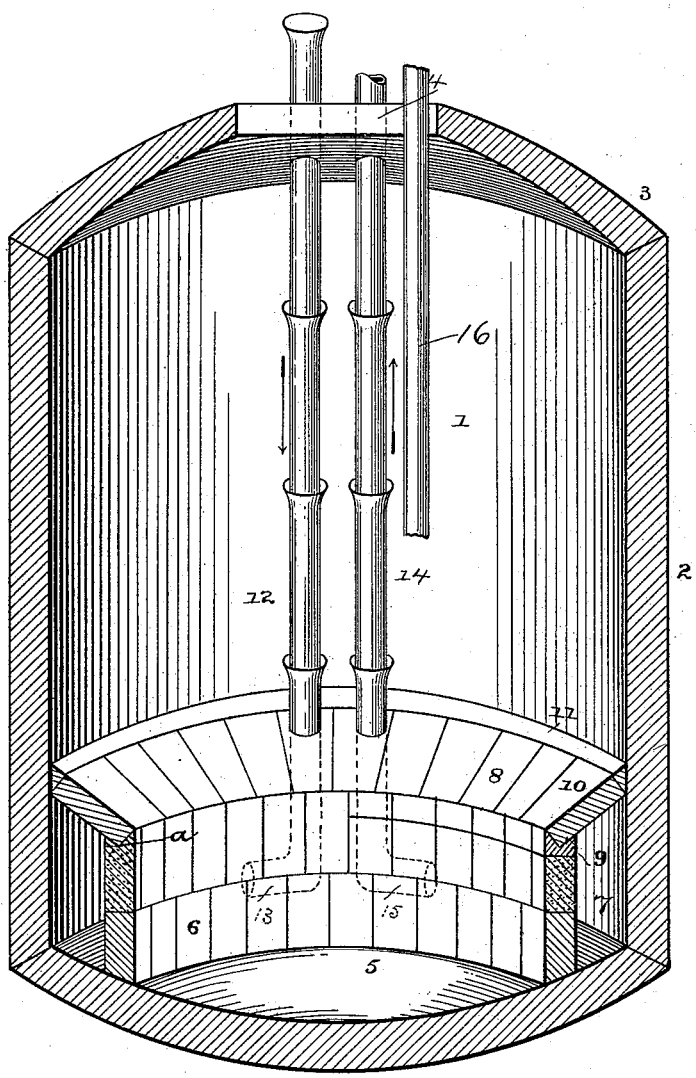
Witnesses
Geo. H. Campbell
E. E. Jones
Inventor
Francis M. Rankin
By his Attorney
Chas. J. Koch

UNITED STATES PATENT OFFICE.

FRANCIS M. RANKIN, OF COVINGTON, OHIO.

FILTER FOR CISTERNS.

SPECIFICATION forming part of Letters Patent No. 370,281, dated September 20, 1887.

Application filed May 9, 1887. Serial No. 237,594. (No model.)

*To all whom it may concern:*

Be it known that I, FRANCIS M. RANKIN, a citizen of the United States, residing at Covington, in the county of Miami and State of Ohio, have invented certain new and useful Improvements in Cisterns and Filters; and I do hereby declare the following to be a full, clear, and exact description of the invention, such as will enable others skilled in the art to which it appertains to make and use the same.

My combined cistern and water-filter comprises a water-receptacle formed of any suitable material and having curved or rounded side walls, a filter formed of brick, sandstone, or other porous filtering material, and built in the bottom of the cistern, said filter being formed with curved vertical walls and built within the central portion of the cistern, so as to leave a surrounding space between the outer wall of said filter and the inner wall of the cistern, and provided at its top with an outwardly-extending circumferential rim, also of filtering material, covering the circumferential space between the filter and the cistern, a vertical water and air supply pipe passing through the filter-rim and having an outturned lower end, and a similarly constructed and arranged overflow and sediment discharging pipe.

The drawing represents in vertical section my improved cistern and filter, in which—

1 represents the cistern, which may be formed of any suitable material. It is preferred that the cistern be constructed with curved side walls, 2, and have an arch-shaped top, 3, with an opening, 4, therein, through which the filtered water may be withdrawn. It is manifest, however, that any suitable pipe may connect either the interior of the filter or any portion of the cistern above said filter and the exterior of the filter, for the purpose of permitting of the withdrawal of the filtered water.

As represented in the drawing, the filter is composed of a vertical bottom portion, 5, of cylindrical shape. This may either be molded in the form of a single ring of suitable filtering material or in two or more sections, which, when placed in position within the cistern, would be cemented together and to the bottom of the cistern; or it may be formed, as represented in the drawing, of blocks 6, of sandstone or other suitable porous filtering material, cemented together at their joints and to the bottom of the cistern, to prevent the passage of water through said joints. This ring-shaped portion, however formed, is of less circumference than the circumference of the cistern, and is arranged, as shown, in the central portion thereof, so as to leave a space, 7, between and surrounding the outer wall of the filter and the inner wall of the cistern.

Superposed on and cemented to the top face of the vertical wall 5 is a circumferential ring or tile, 8, having groove 9, within which the inner edges of the blocks or tiles 10, of porous filtering material, rest and are cemented. These blocks or tiles 10 flare outwardly and upwardly, and are bound together at their outer edges by a ring or tile, 11, cemented thereto, and which rests against the inner wall of the cistern, as shown, whereby said connected blocks or tiles 10 form a cap or cover inclosing the space 7.

In lieu of superposing on the top face of the vertical wall 5 a grooved ring or tile, 8 9, the top of the wall itself may be grooved, as at *a*, to receive the inner edges of the blocks or tiles 10.

12 represents a water and air supply pipe, which may either be in sectional form, as shown, or in one or more lengths, and which extends vertically through the top of the cistern and down the same to and through a hole in the flange 10 11 of the filter into the space 7, the lower section or end of said pipe extending therefrom at a right angle, as represented at 13, in order that the water passing down said pipe will be supplied to the receiving-space 7 in a gentle manner. The water to be filtered may be supplied to the pipe 12 in any convenient or suitable manner—as, for instance, by connecting the same with a supply-pipe, a stream, or by pouring the water down the same, as desired. The water in the space 7 may be readily aerated by forcing the air contained in said pipe down therethrough into the space 7 by pouring a volume of water down said pipe, or air may be forced down said pipe in any other suitable manner. 14 represents a similarly-constructed waste and sediment removing pipe having an outturned lower end, 15, through which any sediment that may collect on the bottom of the space 7 will automatically pass up to and through said discharge-pipe 14 with the overflow when the water supplied through the pipe 12 is in excess of requirement.

The operation of my filter is automatic and very simple and effective. The water passed down the pipe 12 enters the space 7 and gradually percolates through the porous wall 6 and flange 10 of the filter in a filtered state into the cistern, from whence it may be drawn in any convenient or desired manner—as, for instance, through a pipe, 16. The space 7 and the outer walls of the filter and the adjacent wall of the cistern can be readily flushed and all impurities forced up through the pipe 14 by forcing an excess of water down through the pipe 12. By constructing the walls of the filter of circumferential form I secure the strength of an arch to resist the pressure of the incoming water.

Having now described my invention, what I claim is—

1. In combination with a cistern or water-reservoir, a filter consisting of a circular body portion of porous material resting upon the bottom of the reservoir inwardly of the sides thereof, so as to leave a surrounding water-receiving space between the outer wall of said filter and the side wall of the cistern, and having a grooved top face and an outwardly-extending flange or rim composed of a series of blocks or tiles of porous material resting and cemented within the grooved top face of the body portion, and connecting the top of the body portion of the filter and the side wall of the reservoir and covering the space between said filter and cistern, and water and air supply and waste pipes connecting the exterior of the cistern and the space between the filter and the lower part of the cistern, substantially as set forth.

2. The filter herein described, consisting of a circular body portion composed of a series of blocks of porous material cemented together, a top binding-rim having a grooved upper face, and an outwardly and upwardly extending rim or flange composed of a series of blocks or tiles of porous material resting and cemented within the grooved binding-rim, and having a circumferential binding-rim cemented to the outer edges of said blocks or tiles, substantially as and for the purpose set forth.

In testimony whereof I affix my signature in presence of two witnesses.

FRANCIS M. RANKIN.

Witnesses:
   J. H. MARLIN,
   E. J. MARLIN.